(12) United States Patent
Li et al.

(10) Patent No.: US 8,676,784 B2
(45) Date of Patent: *Mar. 18, 2014

(54) RELEVANT INDIVIDUAL SEARCHING USING MANAGED PROPERTY AND RANKING FEATURES

(75) Inventors: Boxin Li, Sammamish, WA (US); Dmitriy Meyerzon, Bellevue, WA (US); Jessica Alspaugh, Seattle, WA (US); Victor Poznanski, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,722

(22) Filed: Jul. 9, 2012

(65) Prior Publication Data
US 2012/0278304 A1  Nov. 1, 2012

Related U.S. Application Data

(63) Continuation of application No. 12/608,181, filed on Oct. 29, 2009, now Pat. No. 8,224,847.

(51) Int. Cl.
*G06F 17/00* (2006.01)

(52) U.S. Cl.
USPC .......................................................... 707/711

(58) Field of Classification Search
USPC .......................................................... 707/711
See application file for complete search history.

(56) References Cited

U.S. PATENT DOCUMENTS

| | | | |
|---|---|---|---|
| 6,785,681 B2 | 8/2004 | Keskar et al. | |
| 7,143,091 B2 | 11/2006 | Charnock et al. | |
| 7,529,735 B2 | 5/2009 | Zhang et al. | |
| 2003/0229529 A1 | 12/2003 | Mui et al. | |
| 2004/0254938 A1* | 12/2004 | Marcjan et al. | 707/100 |
| 2007/0271232 A1* | 11/2007 | Mattox et al. | 707/3 |

OTHER PUBLICATIONS

Craig Macdonald, "The Voting Model for People Search," Feb. 2009, 1 page. http://www.sigir.org/forum/2009J/2009j-sigirforum-macdonald.pdf.
Jun Zhang et al, "Searching for Expertise in Social Networks: A Simulation of Potential Strategies," Nov. 2005, 10 pages. http://www.eecs.umich.edu/ackerm/pub/05b38/zhang-ackerman.group05.final.pdf.
Einat Amitay et al., "Finding People and Documents, Using Web 2.0 Data," Jul. 2008, 5 pages. http://einat.webir.org/fcher2008-social-search.amitay.pdf.
Loren Baker, "People Search Engine Launched by Tickle Social Networking," Apr. 22, 2004, 4 pages.
Boolean Black Belt, "Linked in Search: What it Could and Should be," printed Aug. 17, 2009, 13 pages. http://booleanblackbelt.com/2009/07/linkedin-search-what-it-could-and-should-be/.
Lillejul Demartini, "Expert Space," May 2007. http://sourceforge.net/projects/expertspace/.

* cited by examiner

*Primary Examiner* — Belix M Ortiz Ditren
(74) *Attorney, Agent, or Firm* — Tom Wong; Jim Ross; Micky Minhas

(57) ABSTRACT

Embodiments are configured to provide information relevant to individuals of interest to a searching user. In an embodiment, a method includes identifying relevant individuals of a network using a relevance model that includes the use of a number of managed properties and ranking features to identify relevant individuals of a defined network. The relevance model of one embodiment is defined by a schema that includes a textual matching ranking feature, social distance ranking feature, a levels to top ranking feature, and a proximity ranking feature.

19 Claims, 5 Drawing Sheets

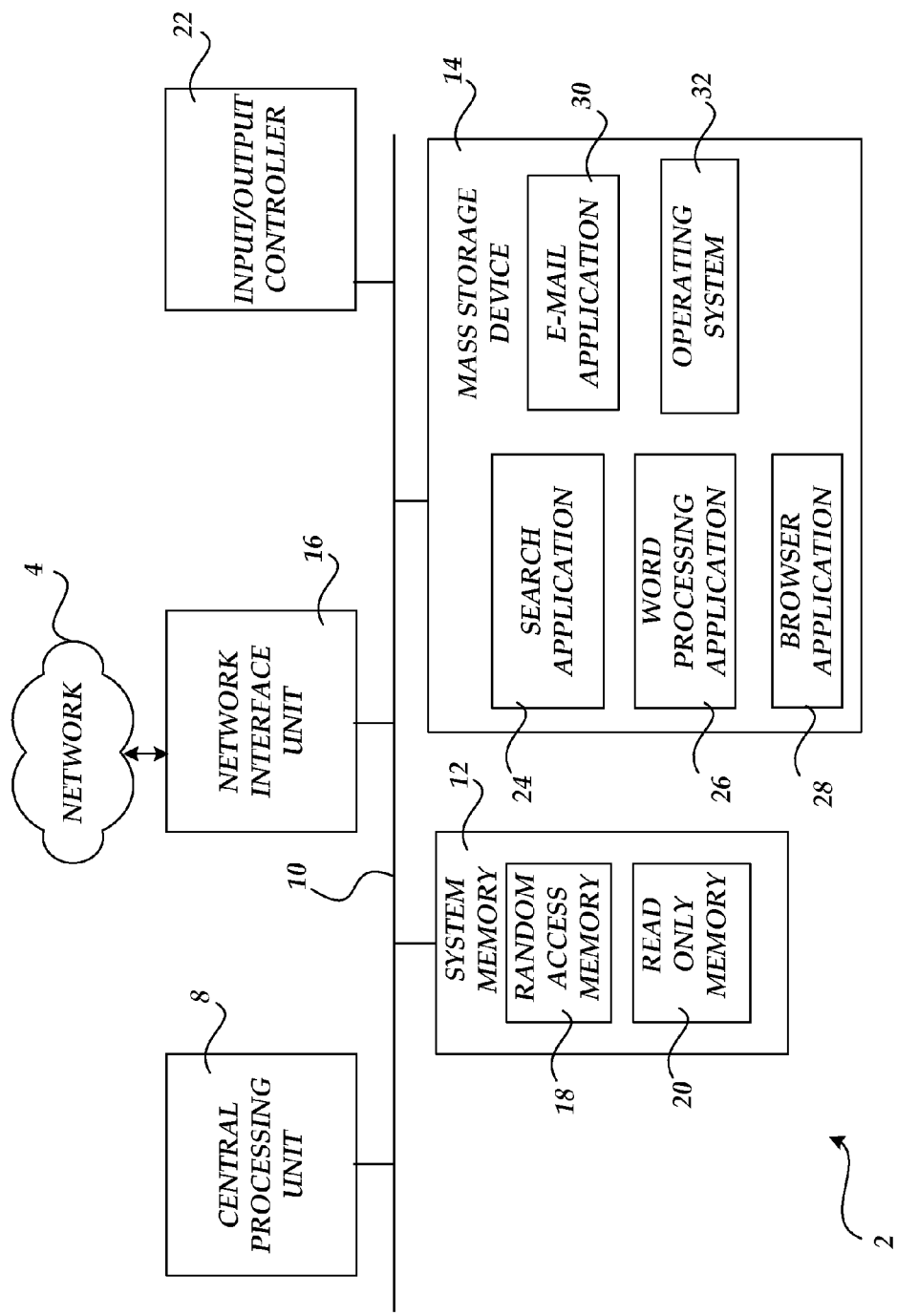

RELEVANT INDIVIDUAL SEARCHING USING MANAGED PROPERTY AND RANKING FEATURES

RELATED APPLICATIONS

The present application is a continuation of U.S. application Ser. No. 12/608,181, filed Oct. 29, 2009, and titled Relevant Individual Searching Using Managed Property and Ranking Features.

BACKGROUND

Computer users have different ways to locate information that may be locally or remotely stored. For example, search engines can be used to locate documents and other files using keywords. Search engines can also be used to perform web-based queries. A search engine attempts to return relevant results based on a query input. Search engines have been designed to surface information from tangible formats, such as documents and databases for example, that contain a large portion of the collective knowledge and expertise of a company or other entity. In some cases, an equal, if not larger, portion of this collective information is maintained in the minds of company employees. Search engines can be limited by an associated relevance model used to rank search results of a query. For example, relevance models designed for searching over documents are generally not configured to focus on returning relevant individuals of interest to a searching user.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are configured to provide information relevant to individuals of interest to a searching user, but are not so limited. In an embodiment, a method includes identifying relevant individuals of a network using a relevance model that includes the use of a number of managed properties and ranking features to identify relevant individuals of a defined network. The relevance model of one embodiment is defined by a schema that includes a textual matching ranking feature, social distance ranking feature, a levels to top ranking feature, and a proximity ranking feature and can be used to identify individuals, including teams, groups, etc. relevant to a query.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIG. 5 is a block diagram illustrating a computing environment for implementation of various embodiments described herein.

DETAILED DESCRIPTION

Embodiments are configured to provide information including using a defined relevance model to provide relevant search results to searching users, but are not so limited. In an embodiment, a search engine can use a relevance model that is based on a number of managed properties and ranking features to identify people associated with some query input. For example, a computing environment can include a search engine that uses the defined relevance model to return special documents which correspond to relevant people that are associated with different teams, groups, and/or other associations. The relevance model of an embodiment is based on a schema that defines a plurality of properties and ranking features including: a textual matching ranking feature, a social distance ranking feature, levels to top (LTT) ranking feature, and/or a proximity ranking feature. For example, the plurality of properties can be representative of people or individuals and define extracted data and/or metadata from search collection items (e.g., documents, particular data structures, etc.). A search engine can use the relevance model to identify relevant individuals of interest for a searching user. The properties, parameters, and/or features of a particular relevance model can be modified according to implementation preferences in various embodiments.

Figure 1:
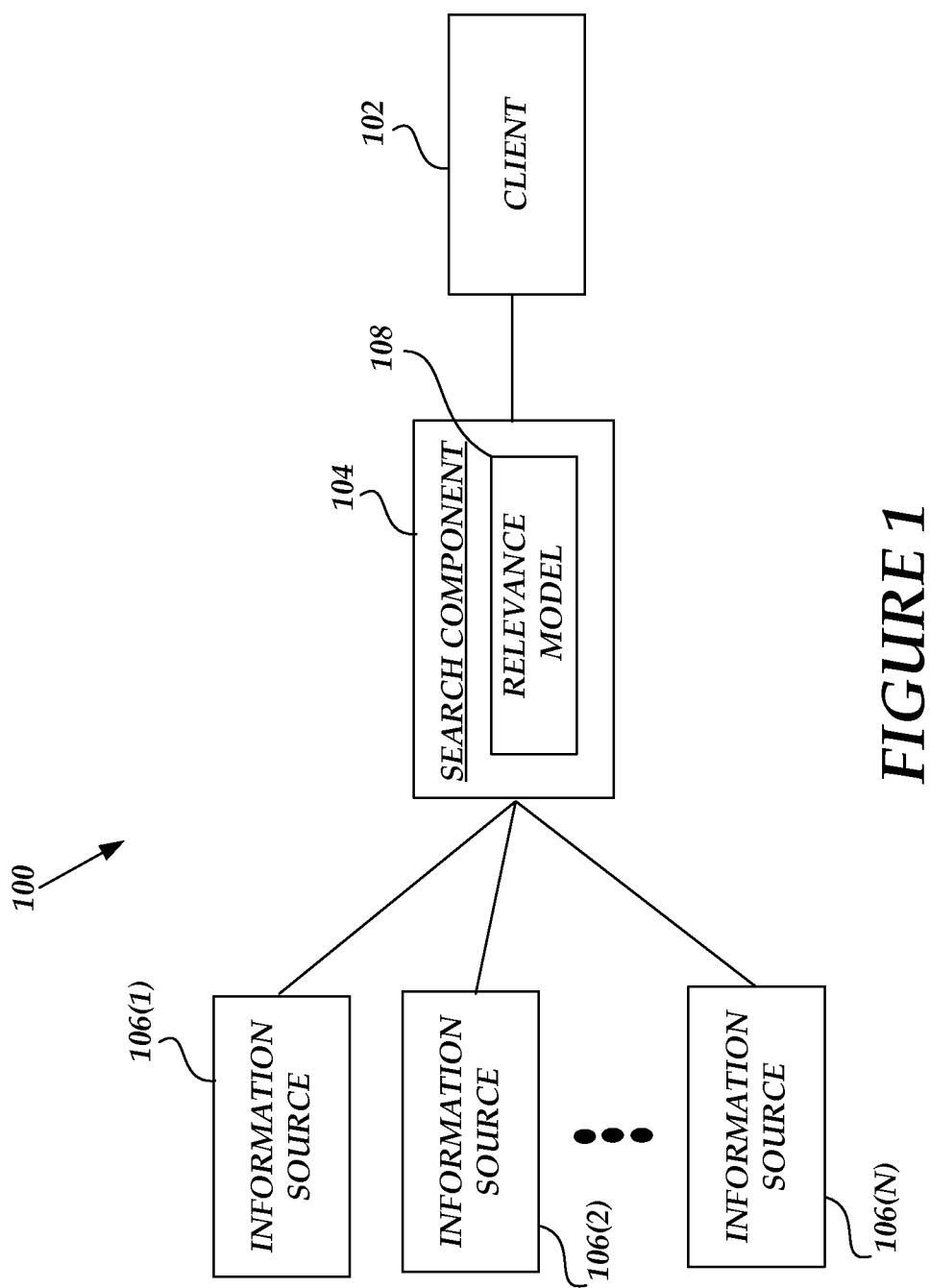
FIG. 1 depicts a block diagram of an example system configured to provide relevant search results.

FIG. 1 is a block diagram of an exemplary system 100 that includes searching functionality used in part to identify relevant individuals of interest to a searching user. The system 100 of an embodiment includes components that operate to provide relevant search results to a searching user based in part on the use of a relevance model and an associated indexed data structure or structures, but is not so limited. In one embodiment, components of the system 100 can be used to return relevant search results which identify an individual or individuals of interest based in part on a particular query and/or identity of a searching user.

As shown in FIG. 1, the system 100 of an embodiment includes at least one client computing device that includes at least one processor and memory (e.g., portable device, desktop, laptop, etc.) or client 102 in communication with a search component 104. The search component 104 is in communication with a number of information sources 106(1)-106(N). In one embodiment, the search component 104 can be configured to selectively communicate with any number of the information sources 106(1)-106(N), including a single information source and/or new sources added to the system 100.

In one embodiment, the search component 104 can be implemented as part of a serving architecture that includes one or more serving computers in communication with the number of information sources 106(1)-106(N). It will be appreciated that clients can also be in communication with one or more of the number of information sources 106(1)-106(N) and/or other components. In an alternative embodiment, some portion of the functionality of the search component 104 can be included with each client. For example, searching and indexing functionality can be shared between a client and a server or servers. As described below, according to various embodiments, components of the system 100 can be configured to provide relevant search results based in part on received query terms, ranking features, and a number of managed properties. In one embodiment, textual matching on the managed properties is used in part to identify individuals relevant to a query.

With continuing reference to FIG. 1, the search component 104 of an embodiment includes a relevance model 108 which defines in part how the search component 104 operates to provide relevant search results. For example, the relevance model 108 can be used as part of searching operations to identify one or more relevant individuals of interest for a searching user based in part on received query terms and an identity or other identifying parameter to identify the searching user. The relevance model 108 can be defined based in part on the use of a schema to include a number of ranking features. In one embodiment, the managed properties can be identified within the schema using a number of property identifiers (pids). For example, the pids can be used by components of the system 100 when returning information identifying individuals having a desired expertise within a technological art.

In one embodiment, a defined schema can be used to employ a relevance model 108 such that the search component 104 resolves relevant individuals of interest based in part on a two stage relevancy determination process that includes the use of a number of managed properties. According to such an embodiment, a first relevancy determination stage of the relevance model 108 operates to use a number of ranking features and managed properties to provide a preliminary number of search results. The second relevancy determination stage of the relevance model 108 uses additional ranking features in conjunction with the first number of ranking features on a subset of the preliminary number of search results to provide (e.g., by resorting a subset generated by the first stage) relevant search results. The relevant search results correspond to one or more relevant individuals of interest to a searching user. It will be appreciated that other embodiments can configure searching operations of each relevancy determination stage according to a desired model and/or crawled information source or sources.

In an embodiment, a schema is used to define a relevance model 108 such that the first relevancy determination stage uses: a plurality of weighted managed properties in conjunction with a textual matching ranking feature; a social distance ranking feature; and a LTT ranking feature to return a preliminary number of search results. The schema is also used to define a second relevancy determination stage applied to a defined number of the preliminary number of search results (e.g., first ranked 1000 hits). For example, the second relevancy determination stage can include additional ranking and/or relevancy determination features that may be more expensive to compute, such as features that require reading positional and other information from an associated index.

In one embodiment, the textual matching ranking feature includes a text-based ranking algorithm that can be used to provide an output based in part on one or more received query terms and all or some number of the managed properties. The output can be used as part of a scoring function when scoring search results to provide relevant search results to a searching user. In one embodiment, the textual matching ranking feature can be used to determine a weight for query terms of a received query (or queries) based in part on a ranking equation that uses managed property parameters (e.g., weight values, b values, constant values, etc.) for each query term hit within one or more of the managed properties (see the example of Table 2 below) for a particular individual of interest. For example, the search component 104 can operate to return search results associated with a relevant individual or individuals of interest based in part on a weighted sum that corresponds with query term hits for a number of managed properties, wherein each managed property includes an associated weight. Correspondingly, the ranking algorithm can be used to assign different weights to query terms based in part on various managed properties deemed useful for determining the relevance of an individual to a search query.

The social distance ranking feature of an embodiment can be used to boost ranking weights of search results based in part on colleague relationships to the user issuing the query. According to one embodiment, the relevance model 108 requires that each search result be grouped into one of three buckets, wherein a search result weight can be increased or decreased or unmodified based in part on which bucket the result falls in. For example, the social distance feature can include: a first bucket or grouping to include search results that have no colleague relationship with a corresponding searcher; a second bucket to include search results that are first level (direct) colleagues of a corresponding searcher; and, a third bucket to include search results that are second level (in-direct) colleagues of a corresponding searcher. Depending on the bucket or grouping, a weight may or may not be added to a ranking weight of a corresponding search result.

The LTT ranking feature of an embodiment includes a static hierarchal-based ranking parameter that can be used to assign or determine a weight based in part on an individual's status within an organization. For example, the LTT ranking feature can be used to determine a weight that is applied to a located individual's position with a managerial chain, project, or some other hierarchy. In one embodiment, the LTT ranking feature can be defined according to how many levels an individual is away from the top of a company reporting hierarchy.

In an embodiment, values for the LTT ranking feature can be defined as: a zero value for an individual at the top of a company reporting hierarchy, a value of one for an individual one level down from the top (first level), a value of two for an individual one level down from the first level, etc. As described below, the relevance model of an embodiment transforms the LTT values using an inverse rational transformation to arrive at a multiplier that is applied to adjust a predefined weight of a LTT ranking feature as part of returning relevant search results which correspond with an individual or individuals of interest based in part on a received query.

The second relevancy determination stage of an embodiment includes using the plurality of managed properties in conjunction with a textual matching ranking feature, the social distance ranking feature, the LTT ranking feature, and a proximity ranking feature as applied to a certain number of results determined from the first stage. The proximity ranking feature can be used to determine a weight that can be added to a relevancy score based in part on how close query terms are to one another in a multi-term query according to managed property hits for a corresponding search result. Stated differently, the proximity ranking feature refers to proximity of search term(s) hits in a given managed property of a search, rather than of proximity of terms in the query itself. In various embodiments, all or some combination of the ranking features can be used in conjunction with the same or some different combination of the managed properties to return relevant search results to a searching user. In an alternative embodiment, the proximity feature can be incorporated into the first relevancy determination stage to define a one stage relevance model 108.

The search component 104 of an embodiment can be used to locate a relevant individual or individuals by using the relevance model 108 including the first and second relevancy determination stages as part of searching a personnel information repository (e.g., a profile store that includes a plurality of profile records). As an example, the search component 104 can operate to use a word, words, phrases, concepts, metadata, and other data to locate relevant individuals of interest based in part on a user query. In various embodiments, the search component 104 can operate to locate relevant information and can be used or incorporated into an operating system (OS), file system, web-based system, application, network, etc. The search component 104 of one embodiment can also be included as an add-in component, wherein the searching functionality can be used by a host system or application.

The search component 104 of an embodiment can be configured to provide relevant search results (e.g., a profile record or records with links, select portions of a profile record, etc.) that correspond with an individual or individuals of interest to a searching user based in part on features of the relevance model 108. For example, the search component 104 can use the relevance model 108 in conjunction with query terms, property information, and/or metadata to provide relevant people results as part of searching local, remote, and combinations of local and remote information repositories. Ranking features of the relevance model 108 can be stored and maintained in local, remote, and/or other storage mediums.

The search component 104 of an embodiment includes indexing functionality. In another embodiment, the indexing functionality can be included as part of a different system component. Indexing operations including indexing and cataloging information can use metadata, content, and other information as part of indexing information of any number of information sources. In one embodiment, the search component 104 can be used in conjunction with the functionality of a serving system, such as the MICROSOFT OFFICE SHAREPOINT SERVER® system, operating to record and use queries and/or query strings, record and use user actions and/or inactions associated with search results, and to record and use other information associated with a relevance determination.

Figure 2:
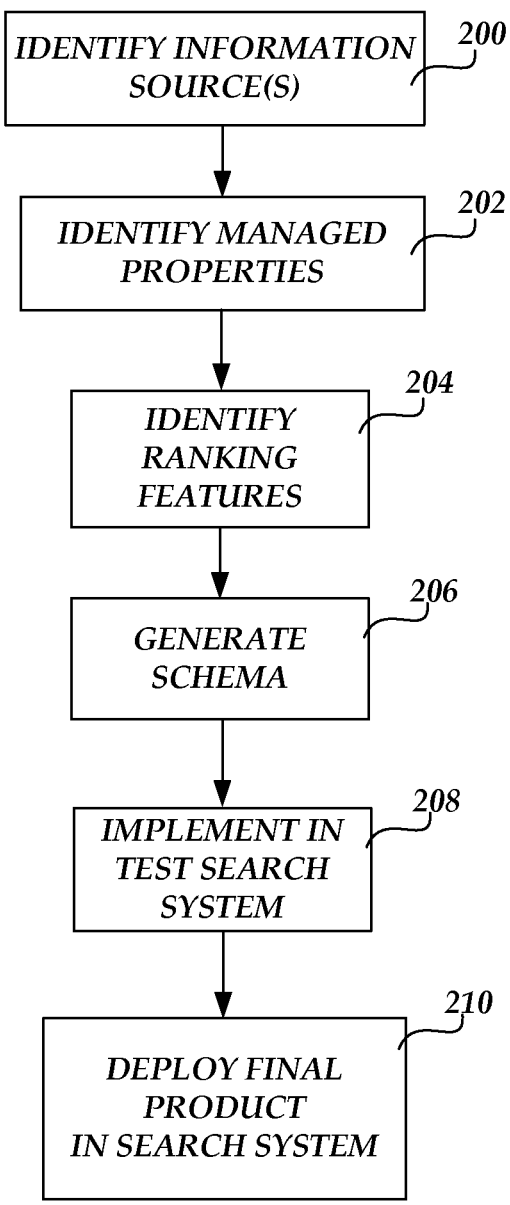
FIG. 2 is a flow diagram illustrating an exemplary process of employing a search system.

FIG. 2 is a flow diagram illustrating an exemplary process of employing a search system that includes a schema-based relevancy model in a computer-implemented searching environment. At 200, the build process identifies and communicates with one or more preferred information sources for searching and indexing purposes. For example, an enterprise administrator can identify one or more profile stores and/or other data and metadata stores to use in defining a relevance model to return search results identifying relevant individuals for a searching user. In one embodiment, once the information sources are coupled or in communication with the search system, components of the system can operate to begin building an inverted index for searching operations.

At 202, a number of managed properties are identified for including with the relevance model. The managed properties can be predefined and/or defined during the build process. At 204, ranking features are identified for use with the relevance model, including defining weighting factors, transformation parameters, and/or other aspects of the ranking features. The managed properties, weighting factors, etc. can be predefined and/or defined during the build process or at some other time. In one embodiment, components of the search system can be used to dynamically update the relevance model by modifying additional ones of certain managed properties, ranking features, and/or other searching parameters.

At 206, the build process generates a schema based in part on the number of managed properties and ranking features included as part of the relevance model. At 208, the schema is implemented in a test search system as part of machine learning and/or manual tuning operations to generate optimal parameters of the number of managed properties and/or ranking features. In one embodiment, 208 can be optional according to a desired implementation. At 210, the schema and associated optimized relevance model can be deployed in a search system. For example, a schema and an associated relevance model can be tailored to a particular entity's types of managed properties to use in returning relevant search results. While a certain number and order of operations is described for the exemplary flow of FIG. 2, it will be appreciated that other numbers and orders can be defined according to a desired implementation.

Figure 3:
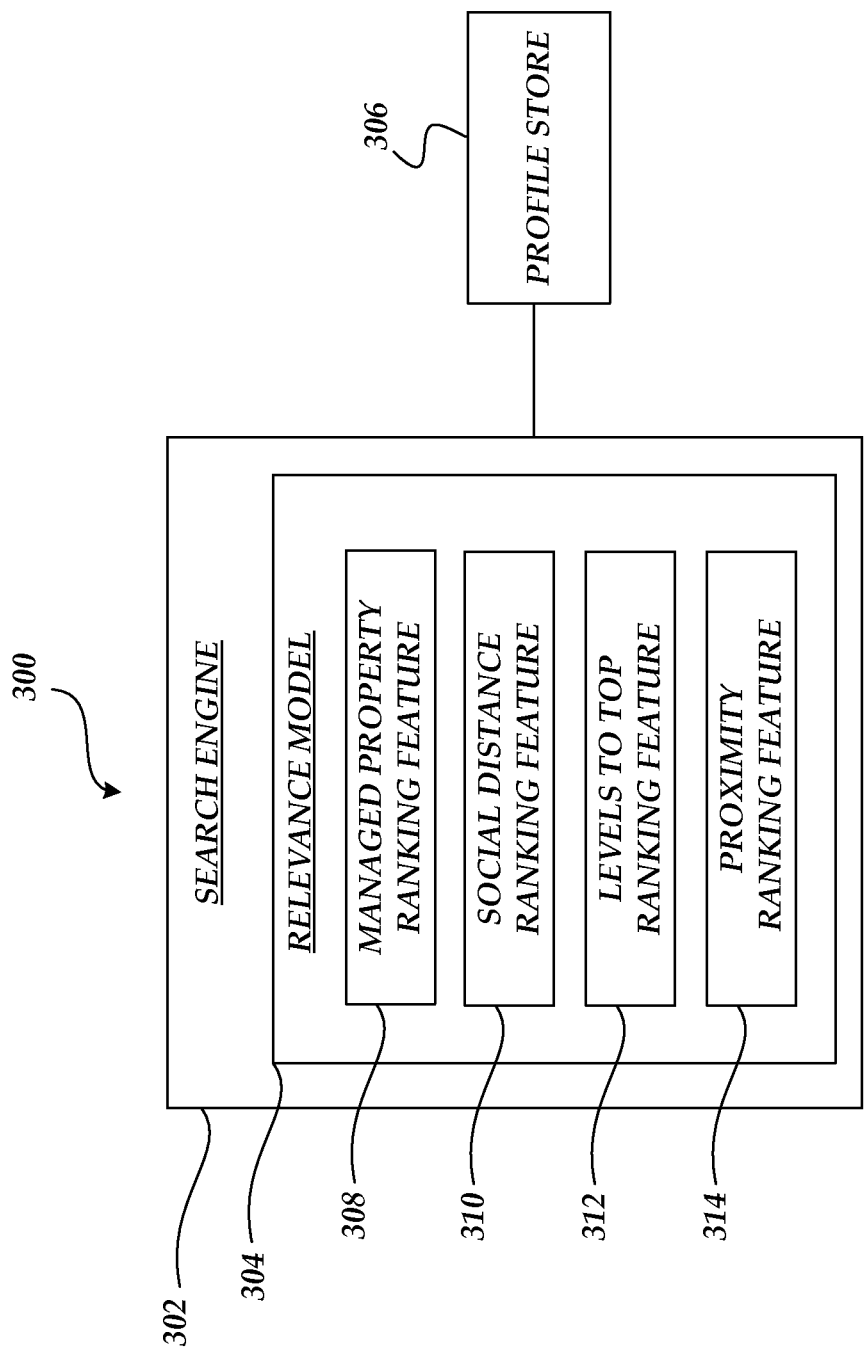
FIG. 3 depicts a block diagram of an exemplary search system.

FIG. 3 depicts an exemplary search system 300. The search system 300 of an embodiment includes a search engine 302 that operates according to a relevance model 304 to provide information, including identification information, associated with relevant individuals to searching users. For example, in attempting to locate individuals specializing in some matter within a defined network, a user can enter query terms into a browser or other application and the search engine 302 can identify relevant individuals for the searching user or users. An exemplary query can include one or more terms, such as keywords, phrases, acronyms, etc.

In one embodiment, the search engine 302 can be implemented as part of a networked computing environment to provide information about relevant individuals as part of searching an information source 306, such as a profile store. While one information source 306 is shown, the system 300 is not so limited. In one embodiment, information source 306 includes a storage media that contains one or more instances of personnel data for a plurality of individuals associated with an organization, network, or other entity. Personnel data includes data structures representing identification information for each individual associated with the system 300 including organizational relationships between a plurality users, but is not so limited.

In one embodiment, a profile store includes a plurality of profile records, wherein each profile record includes searchable metadata associated with a respective individual. The metadata can include any searchable information of a given individual that may be of interest to other searchers. For example, the metadata may include, but is not limited to, names, titles e-mail addresses, office numbers, lists of public or private colleagues, memberships in forums or discussion groups, biographical information, phone numbers, identifications of managerial or supervisory personnel, pictures, work history, past projects, particular areas of responsibility or expertise, skills or training, organization memberships, etc.

Ranking features and managed properties of the relevance model 304 define how the search engine 302 identifies and/or scores relevant individuals of interest to a searching user. The relevance model 304 includes the use of a number of ranking features and managed properties to identify relevant individuals for a searching user. In one embodiment, the relevance model 304 can be dynamically configured according to a schema to selectively conform to and/or interact with new, modified, and/or different information sources. For example, managed properties used by one enterprise may be different than the managed properties used by another enterprise and a defined schema can be used for each enterprise.

A schema of one embodiment can be used to define a relevance model 304 that includes a textual matching ranking feature 308, a social distance ranking feature 310, a LTT ranking feature 312, and a proximity ranking feature 314. In one embodiment, the relevance model 304 includes a first identification stage and a second identification stage, wherein the second identification stage identifies relevant individuals for a searching user based in part on select number and/or type of results from the first identification stage. The second stage uses the proximity ranking feature 314 in part to further refine search results for the searching user. For example, the second stage can be used to resort the top results generated by the first stage using additional ranking features.

As described below, the search engine 302 of an embodiment provides relevant search results based in part on textual matching ranking feature 308 that uses a ranking equation and managed property parameters (e.g., weights, pid, etc.), the social distance ranking feature 310, the LTT ranking feature 312, and the proximity ranking feature 314. In an alternative embodiment, the relevance model 304 includes a single stage model that uses each ranking feature and the managed properties as part of ranking search results.

Table 1 lists a number of exemplary managed properties of one embodiment. It will be appreciated that the managed properties can be used as ranking or relevancy parameters when identifying a relevant individual or individuals based in part on terms of a received query.

TABLE 1

| ID | Managed Property | Description |
|---|---|---|
| 1 | Contents | Miscellaneous useful content that is not captured by any other property |
| 15 | AccountName | Account name in the form of <DomainName>\<UserName> |
| 19 | PreferredName | Preferred name |
| 21 | WorkEmail | Work email |
| 24 | JobTitle | Job title |
| 25 | Department | An organization department |
| 26 | AboutMe | A small snippet about the individual authored by him/herself. |
| 27 | UserName | User name of the individual |
| 35 | Memberships | Display names of email aliases the individual belongs |
| 39 | Responsibilities | Responsibilities |
| 40 | Skills | Skills |
| 41 | Interests | Interests |
| 175 | ContentsHidden | Hidden content |
| 180 | Pronunciations | Phonetic pronunciation of the individual's name |
| 268 | Email aliases | Display names of useful email aliases the individual belongs. In one embodiment, an alias is deemed useful for the purpose of relevance ranking if a member count is within certain upper and lower bounds. |
| 313 | SipAddress | Session initiation protocol (Sip) address |
| 389 | OrgNames | Display name of organizations the individual belongs |
| 391 | CombinedName | Different combinations of the individual's last and first names. In one embodiment, the format is composed of the following four parts:<br><FirstName><space><LastName><br><FirstName><LastName><br><LastName><space><FirstName><br><LastName><FirstName> |
| 396 | OrgParentNames | Display name of parent organizations of the organizations the individual belongs |

In one embodiment, the managed properties of Table 1 can be incorporated into the relevance model 304 to return information associated with relevant individuals to a searching user based in part on received query terms in conjunction with equation (1) below, and based in part on an identity (e.g., identifying information) of the searching user. For example, an authenticated user of a network can use a browser or other application to input a query string in attempts to identify relevant individuals within the user's network. The searching user may be attempting to identify someone having a certain expertise, knowledge, or skills relevant at a given time.

As discussed above, the textual matching ranking feature 308 can be used to determine a weight for query terms of a received query using equation (1) and managed property parameters (e.g., weights, pid, etc.) for each query term hit within a managed property of each identified individual (record). In one embodiment, equation (1) can be defined as:

$$x_{iBM\ 25main} = BM25G_{main}(Q, D) = \frac{\left(\left(\sum_{i \in Q} \frac{TF'_t}{k'_1 + tF'_t} * \log\left(\frac{N}{n_t}\right)\right) - M\right)}{S} \quad (1)$$

The formula for $TF'_t$ can be calculated as follows:

$$TF'_t = \sum_{p \in D} TF_{t,p} * w_p * \frac{1 + b_p}{\left(\frac{DL_p}{AVDL_p} + b_p\right)}$$

where:
Q is a query string,
t is an individual query term tokenized from a query string according to query language,
D is a result being scored,
p refers to an individual managed property,
N is a total number of results in a search domain,
$n_t$ is a number of results containing term t,
$DL_p$ is a length of the property p,
$AVDL_p$ is an average length of the property p,
$TF_{t,p}$ is a term t frequency in the property p,
$w_p$ and $b_p$ are tunable parameters,
iBM25main is an index of an input node, and,
M and S represent mean and standard deviation normalization constants.

The social distance ranking feature 310 of an embodiment can be used to boost ranking weights of search results for each relevant individual by adding additional weighting factors based in part on colleague relationships to the user issuing the query. The social distance ranking feature 310 of one embodiment can be used to manipulate ranking weights by grouping search results into three groups, but is not so limited: a first group that includes search results that have no colleague relationship with a searching user; a second group that includes search results that are first level (direct) colleagues of the searching user; and, a third group that includes search results that are second level (in-direct) colleagues of the searching user. Depending on the group, a weight may or not be added to a ranking weight of a search result. In other embodiments, number and/or types of grouping can be configured according to a people search implementation.

Social distance information can be indexed and used by the search engine to rank search results. In one embodiment, social distance information refers to colleague relationships existing between two or more different individuals. For example, social distance can be described by relationship levels from the perspective of a given searching user. Each individual can have "first level" colleagues, "second level" colleagues (e.g., colleagues of first level colleagues), etc. Different level colleagues may possess particular expertise as to subject matter of interest for an associated search.

Social distance between a first individual and a second individual can refer to how many degrees of separation exist in any relationship between the individuals. For example, colleagues having some degree of social trust or familiarity can be described as "first-level" colleagues. Continuing the example, colleagues can be described as "second-level" colleagues if they are linked to one another by another common colleague. It will be appreciated that second-level colleagues may or may not have the same degree of social trust or familiarity as first-level colleagues. In one embodiment, second-level colleagues share at least one first-level colleague.

In an embodiment, a crawl process can be used to populate an inverted index with information relevant to individuals associated with the system 300, including social distance information. For example, the system 300 component can employ a crawler which can operate to crawl a file system, web-based collection, or other repository when collecting profile and other metadata. Profile crawls can include the crawling of an entire profile store (e.g., full processes), incremental processes which process and analyze only those portions of the profile store that have changed since a last incremental or full crawl. For example, an incremental crawl operation may pertain to a user's social distance information that has changed since a last crawl. Crawl processes can be repeated automatically, or may be triggered manually, as appropriate in different implementations.

As part of the crawl process, components of the system 300 can periodically update one or more indexes. In one embodiment, the system 300 can maintain two indexes used in returning search results. For example, a first index can be used to index keywords from document bodies and/or metadata associated with web sites, file servers, and other information repositories. The secondary index can be used to index additional textual and static features that may not be directly obtained from a document, such as certain personnel related information. As an example, additional textual and static features may include anchor text, click distance, interactive click data, and/or other features. Using a secondary index, separate update schedules can be maintained. For example, when a new search result is clicked, a partial rebuild of the secondary index can be done, while the main index may remain unchanged.

Social distance information used as part of the social distance ranking feature 310 can be collected as part of an interactive dialogue with a given individual to specify or identify first-level colleagues. Social distance information can also be inferred by analyzing email and other communications of two or more individuals, or other representations of personnel relationships. Inferred information can be presented for approval, editing, rejection, etc.

The LTT ranking feature 312 of one embodiment depends on how many levels an individual is away from the top of a reporting hierarchy. For example, values for the LTT ranking feature 312 can be defined as: a zero value for an individual at the top of a reporting hierarchy, a value of one (1) for an individual one level down from the top (first level), a value of two (2) for an individual one level down from the first level, etc. In one embodiment, LTT values can be transformed using an inverse rational transformation to arrive at a multiplier.

For example, the inverse rational transformation can be defined as:

$=1/(1+xk)$, where x is the value being transformed (e.g., LTT value) and k is an adjustable constant.

The resulting multiplier can be applied to a predefined weight of the LTT ranking feature 312 as part of returning relevant individuals to a searching user.

The proximity ranking feature 314 of an embodiment can be used to assign a weight based in part on how close query terms are to one another in a multi-term query according to managed property hits for a corresponding search result. A weight can be determined based in part on how close query terms are to one another for each managed property hit. Correspondingly, the proximity ranking feature 314 can be used to add further focus to a search within defined portions of large data set (e.g., a multidimensional query space).

In one embodiment, a weight can be determined using proximity parameters (e.g., smallest length of term to term spans) for each managed property hit by transforming a corresponding predefined weight of each managed property included in the proximity ranking feature 314. The adjusted weights can be used (e.g., added to a score) when scoring relevant individuals. In one embodiment, the predefined proximity weights are transformed using a rational transformation. For example, the rational transformation can be defined as:

$=x/(x+k)$, where x is the value being transformed (e.g., predefined proximity weight value) and k is an adjustable constant.

The schema used to implement a relevance model 304 in the system 300 of an embodiment can be defined based in part on the use of the property identifiers (pids) of Table 1 (above) as follows, but is not so limited:

```
<?xml version="1.0"?>
<xs:schema         targetNamespace="urn:Search.Ranking.Model.2NN"
xmlns:rm="urn:Search.Ranking.Model.2NN"
xmlns:xs="http://www.w3.org/2001/XMLSchema"    attributeFormDefault="unqualified"
elementFormDefault="qualified">
    <xs:simpleType name="GUIDType">
        <xs:restriction base="xs:string">
            <xs:pattern        value="[A-Fa-f0-9]{8}-([A-Fa-f0-9]{4}-){3}[A-Fa-f0-
9]{12}"/>
        </xs:restriction>
    </xs:simpleType>
    <xs:simpleType name="pidType">
        <xs:restriction base="xs:unsignedInt">
            <xs:minInclusive value="1"/>
        </xs:restriction>
    </xs:simpleType>
    <xs:simpleType name="HiddenNodesCountType">
        <xs:restriction base="xs:unsignedInt">
            <xs:minInclusive value="1"/>
            <xs:maxInclusive value="8"/>
        </xs:restriction>
    </xs:simpleType>
```

```
<xs:simpleType name="KType">
    <xs:restriction base="xs:float">
        <xs:minExclusive value="0" />
    </xs:restriction>
</xs:simpleType>
<xs:simpleType name="TransformTypeType">
    <xs:restriction base = "xs:string">
        <xs:enumeration value = "Rational"/>
        <xs:enumeration value = "InvRational"/>
        <xs:enumeration value = "Linear"/>
    </xs:restriction>
</xs:simpleType>
<xs:complexType name="TransformType">
    <xs:attribute name="type" type="rm:TransformTypeType" />
    <xs:attribute name="k" type="rm:KType" />
    <xs:attribute name="a" type="xs:float" />
    <xs:attribute name="b" type="xs:float" />
    <xs:attribute name="maxx" type="xs:unsignedInt" />
</xs:complexType>
<xs:complexType name="PrecomputeForRangeType">
<xs:attribute name="from" type="xs:unsignedInt" />
    <xs:attribute name="to" type="xs:unsignedInt" />
</xs:complexType>
<xs:complexType name="NormalizeType">
    <xs:attribute name="SDev" type="xs:float" />
    <xs:attribute name="Mean" type="xs:float" />
</xs:complexType>
<xs:complexType name="WeightsType">
    <xs:sequence>
        <xs:element    name="Weight"    minOccurs="1"    maxOccurs="8" type="xs:float" />
    </xs:sequence>
</xs:complexType>
<xs:complexType name="ThresholdsType">
    <xs:sequence>
        <xs:element    name="Threshold"    minOccurs="1"    maxOccurs="8" type="xs:float" />
    </xs:sequence>
</xs:complexType>
<xs:complexType name="AddsType">
    <xs:sequence>
        <xs:element name="Add" minOccurs="1" maxOccurs="8" type="xs:float" />
    </xs:sequence>
</xs:complexType>
<xs:complexType name="BucketType" >
    <xs:sequence>
        <xs:element name="HiddenNodesAdds" type="rm:AddsType" />
    </xs:sequence>
    <xs:attribute name="name" type="xs:string" use="optional" />
    <xs:attribute name="value" type="xs:unsignedInt" use="required" />
</xs:complexType>
    <xs:complexType name="MinSpanType">
    <xs:all>
        <xs:element name="Transform" type="rm:TransformType" />
        <xs:element name="Normalize" type="rm:NormalizeType" minOccurs="0"/>
        <xs:element name="Layer1Weights" type="rm:WeightsType" />
    </xs:all>
    <xs:attribute name="name" type="xs:string" use="optional" />
    <xs:attribute name="pid" type="rm:BM25PropertyPidType" use="required" />
    <xs:attribute name="default" type="xs:float" use="required" />
    <xs:attribute name="maxMinSpan" type="xs:unsignedInt" use="required" />
</xs:complexType>
<xs:simpleType name="LevelToTopPidType">
    <xs:restriction base="rm:pidType">
        <xs:enumeration value="267"/>
    </xs:restriction>
</xs:simpleType>
<xs:complexType name="StaticType">
    <xs:all>
        <xs:element name="Transform" type="rm:TransformType" />
        <xs:element name="Normalize" type="rm:NormalizeType" minOccurs="0"/>
        <xs:element name="Layer1Weights" type="rm:WeightsType" />
        <xs:element                             name="PrecomputeForRange" type="rm:PrecomputeForRangeType" minOccurs="0" />
    </xs:all>
    <xs:attribute name="name" type="xs:string" use="optional" />
    <xs:attribute name="pid" type="rm:LevelToTopPidType" use="required" />
    <xs:attribute name="default" type="xs:unsignedInt" use="required" />
</xs:complexType>
```

-continued

```
<xs:complexType name="SocialDistanceType" >
    <xs:sequence>
        <xs:element name="Bucket" type="rm:BucketType" minOccurs="1" maxOccurs="3" />
    </xs:sequence>
    <xs:attribute name="name" type="xs:string" use="optional" />
</xs:complexType>
<xs:simpleType name="BM25WType">
    <xs:restriction base="xs:float">
        <xs:minInclusive value="0" />
    </xs:restriction>
</xs:simpleType>
<xs:simpleType name="BM25BType">
    <xs:restriction base="xs:float">
        <xs:minInclusive value="0" />
    </xs:restriction>
</xs:simpleType>
<xs:simpleType name="BM25PropertyPidType">
    <xs:restriction base="rm:pidType">
        <xs:enumeration value="1"/>
        <xs:enumeration value="15"/>
        <xs:enumeration value="19"/>
        <xs:enumeration value="21"/>
        <xs:enumeration value="24"/>
        <xs:enumeration value="26"/>
        <xs:enumeration value="27"/>
        <xs:enumeration value="35"/>
        <xs:enumeration value="39"/>
        <xs:enumeration value="40"/>
        <xs:enumeration value="41"/>
        <xs:enumeration value="180"/>
        <xs:enumeration value="268"/>
        <xs:enumeration value="313"/>
        <xs:enumeration value="389"/>
        <xs:enumeration value="391"/>
        <xs:enumeration value="396"/>
    </xs:restriction>
</xs:simpleType>
<xs:complexType name="BM25PropertyType">
    <xs:attribute name="name" type="xs:string" use="optional" />
    <xs:attribute name="pid" type="rm:BM25PropertyPidType" use="required" />
    <xs:attribute name="w" type="rm:BM25WType" use="required" />
    <xs:attribute name="b" type="rm:BM25BType" use="required" />
    <xs:attribute name="inanchor" type="xs:boolean" use="optional" />
    <xs:attribute name="extractOccurrence" type="xs:boolean" use="optional" />
</xs:complexType>
<xs:complexType name="BM25PropertiesType">
    <xs:sequence>
        <xs:element name="Property" type="rm:BM25PropertyType" minOccurs="1" maxOccurs="unbounded" />
    </xs:sequence>
</xs:complexType>
<xs:complexType name="BM25Type">
    <xs:all>
        <xs:element name="Normalize" type="rm:NormalizeType" minOccurs="0"/>
        <xs:element name="Layer1Weights" type="rm:WeightsType" minOccurs="0" />
        <xs:element name="Properties" type="rm:BM25PropertiesType" />
    </xs:all>
    <xs:attribute name="name" type="xs:string" use="optional" />
    <xs:attribute name="k1" type="rm:KType" use="required" />
</xs:complexType>
<xs:complexType name="RankingFeaturesType">
    <xs:sequence>
        <xs:element name="BM25Main" type="rm:BM25Type" />
        <xs:choice minOccurs="0" maxOccurs="unbounded">
            <xs:element name="Static" type="rm:StaticType" />
            <xs:element name="SocialDistance" type="rm:SocialDistanceType" />
            <xs:element name="MinSpan" type="rm:MinSpanType" />
        </xs:choice>
    </xs:sequence>
</xs:complexType>
```

```
<xs:complexType name="HiddenNodesType">
    <xs:all>
        <xs:element name="Thresholds" type="rm:ThresholdsType" />
        <xs:element name="Layer2Weights" type="rm:WeightsType" />
    </xs:all>
    <xs:attribute name="count" type="rm:HiddenNodesCountType" use="required" />
</xs:complexType>
<xs:complexType name="RankingModel2NNType">
    <xs:sequence>
        <xs:element name="HiddenNodes" type="rm:HiddenNodesType" />
        <xs:element name="RankingFeatures" type="rm:RankingFeaturesType" />
    </xs:sequence>
    <xs:attribute name="id" type="rm:GUIDType" use="required" />
    <xs:attribute name="maxStageWidCount" type="xs:unsignedInt" use="optional" />
</xs:complexType>
<xs:complexType name="RankingModel2StageType">
    <xs:sequence>
        <xs:element name="RankingModel2NN" type="rm:RankingModel2NNType" minOccurs="1" maxOccurs="2" />
        <xs:any namespace="##other" processContents="skip" minOccurs="0" maxOccurs="unbounded" />
    </xs:sequence>
    <xs:attribute name="id" type="rm:GUIDType" use="required" />
    <xs:attribute name="name" type="xs:string" use="optional" />
    <xs:attribute name="description" type="xs:string" use="optional" />
</xs:complexType>
<xs:element name="RankingModel2Stage" type="rm:RankingModel2StageType" />
</xs:schema>
```

As an example, the schema above can be used to define a two stage searching algorithm for use in relevancy determination processes and can be incorporated as part of the functionality of search engine 302. The search engine 302 can operate to return information associated with one or more relevant individuals based in part on at least one received query term and a searcher's identity. The particular weights and adjustable constants can be based in part on results acquired using a machine learning algorithm and/or manual input. For example, weights can be adjusted up or down depending on the importance of a managed property for a particular searching environment.

As used below for the Property Names below, w refers to a weight of a managed property, b refers to the importance of length normalization, pid refers to a property identifier, SDev and mean are standard deviation and mean parameters, and an extractOccurrence function operates to enable the proximity ranking feature 314 for an associated managed property.

The searching algorithm defined as:

```
<?xml version="1.0"?>
<RankingModel2Stage name="MainPeopleModel" description="Main people
ranking model" id="DBBA-06-42-B99CA1" xmlns = "urn:Search.Ranking.Model.2NN">
    <RankingModel2NN id="8FAC4-0F-A8-0CD" >
        <HiddenNodes count="1">
            <Thresholds>
                <Threshold>0.0</Threshold>
            </Thresholds>
            <Layer2Weights>
                <Weight>1.0</Weight>
            </Layer2Weights>
        </HiddenNodes>
        <RankingFeatures>
            <BM25Main name="ContentRank" k1="1.0">
                <Layer1Weights>
                    <Weight>1.0</Weight>
                </Layer1Weights>
                <Properties>
                    <Property name="CombinedName"    pid="391"    w="0.5" b="0.97557067"/>
                    <Property name="PreferredName"   pid="19"     w="0.5" b="0.97557067"/>
                    <Property name="AccountName"     pid="15"     w="0.5" b="0.97557067"/>
                    <Property name="UserName"        pid="27"     w="0.5" b="0.97557067"/>
                    <Property name="WorkEmail"       pid="21"     w="0.5" b="0.97557067"/>
                    <Property name="SipAddress"      pid="313"    w="0.5"
```

```
                b="0.97557067"/>
                <Property name="JobTitle"        pid="24" w="1.5" b="0.97557067"/>
                <Property name="Responsibilities" pid="39" w="1.5" b="0.1"/>
                <Property name="Skills"          pid="40" w="0.1" b="0.1"/>
                <Property name="Interests"       pid="41" w="0.1" b="0.1"/>
                <Property name="AboutMe"                 pid="26"   w="0.1"
b="0.97557067"/>
                <Property name="Memberships"     pid="35" w="0.15" b="100"/>
                <Property name="OrgNames"        pid="389" w="3.0" b="0"/>
                <Property name="Department"      pid="25" w="3.0" b="0"/>
                <Property name="OrgParentNames"  pid="396" w="0.1" b="0"/>
                <Property name="Contents"        pid="1" w="0.1" b="0.97557067"/>
                <Property   name="ContentsHidden"           pid="175"   w="0.1"
b="0.97557067"/>
                <Property   name="Pronunciations"           pid="180"   w="0.01"
b="0.97557067"/>
              </Properties>
            </BM25Main>
            <SocialDistance name="SocialDistance">
              <Bucket name="DistanceUndefined" value="0">
                <HiddenNodesAdds>
                  <Add>0.0</Add>
                </HiddenNodesAdds>
              </Bucket>
              <Bucket name="Distance1" value="1">
                <HiddenNodesAdds>
                  <Add>0.25</Add>
                </HiddenNodesAdds>
              </Bucket>
              <Bucket name="Distance2" value="2">
                <HiddenNodesAdds>
                  <Add>0.24</Add>
                </HiddenNodesAdds>
              </Bucket>
            </SocialDistance>
            <Static name="LevelsToTop" pid="267" default="3">
              <Transform type="InvRational" k="1"/>
              <Normalize SDev="0.1445450336" Mean="0.5663648844"/>
              <Layer1Weights>
                <Weight>0.3</Weight>
              </Layer1Weights>
              <PrecomputeForRange from="0" to="20"/>
            </Static>
          </RankingFeatures>
        </RankingModel2NN>
        <RankingModel2NN       id="D9BFB1A1-9036-4627-83B2-BBD9983AC8A1"
maxStageWidCount="1000">
          <HiddenNodes count="1">
            <Thresholds>
              <Threshold>0.0</Threshold>
            </Thresholds>
            <Layer2Weights>
              <Weight>1.0</Weight>
            </Layer2Weights>
          </HiddenNodes>
          <RankingFeatures>
            <BM25Main name="ContentRank" k1="1.0">
              <Layer1Weights>
                <Weight>1.0</Weight>
              </Layer1Weights>
              <Properties>
                <Property name="CombinedName"    pid="391" w="0.5" b="0"/>
                <Property name="PreferredName"   pid="19" w="0.5" b="0"/>
                <Property name="AccountName"     pid="15" w="0.5" b="0"/>
                <Property name="UserName"        pid="27" w="0.5" b="0"/>
                <Property name="WorkEmail"       pid="21" w="0.5" b="0"/>
                <Property name="SipAddress"      pid="313" w="0.5" b="0"/>
                <Property name="JobTitle"                pid="24"   w="1.5"   b="0"
extractOccurrence="1"/>
                <Property name="Responsibilities"        pid="39"   w="1.5"   b="10"
extractOccurrence="1"/>
                <Property name="Skills"                  pid="40"   w="0.1"   b="1"
extractOccurrence="1"/>
                <Property name="Interests"               pid="41"   w="0.1"   b="1"
extractOccurrence="1"/>
                <Property name="AboutMe"                 pid="26"   w="0.1"   b="1"
extractOccurrence="1"/>
                <Property name="Memberships"             pid="35"   w="0.15"  b="100"
```

-continued

```
extractOccurrence="1"/>
            <Property name="OrgNames"        pid="389" w="3.0"  b="0"
extractOccurrence="1"/>
            <Property name="Department"      pid="25"  w="3.0"  b="0"
extractOccurrence="1"/>
            <Property name="OrgParentNames"  pid="396" w="0.1" b="0" />
            <Property name="Contents"        pid="1"   w="0.1"  b="1"
extractOccurrence="1"/>
            <Property name="ContentsHidden"  pid="175" w="0.1"  b="1"
extractOccurrence="1"/>
            <Property name="Pronunciations"  pid="180" w="0.01" b="1"/>
          </Properties>
        </BM25Main>
        <MinSpan name="JobTitle" pid="24" default="0" maxMinSpan="300">
          <Transform type="Rational" k="0.03"/>
          <Normalize SDev="0.16666667" Mean="0.5"/>
          <Layer1Weights>
           <Weight>5.0</Weight>
          </Layer1Weights>
        </MinSpan>
        <MinSpan       name="Responsibilities"      pid="39"      default="0"
maxMinSpan="100">
          <Transform type="Rational" k="0.03"/>
          <Normalize SDev="0.16666667" Mean="0.5"/>
          <Layer1Weights>
           <Weight>5.0</Weight>
          </Layer1Weights>
        </MinSpan>
        <MinSpan name="Skills" pid="40" default="0" maxMinSpan="100">
          <Transform type="Rational" k="0.03"/>
          <Normalize SDev="0.16666667" Mean="0.5"/>
          <Layer1Weights>
           <Weight>0.5</Weight>
          </Layer1Weights>
        </MinSpan>
        <MinSpan name="Interests" pid="41" default="0" maxMinSpan="100">
          <Transform type="Rational" k="0.03"/>
          <Normalize SDev="0.16666667" Mean="0.5"/>
          <Layer1Weights>
           <Weight>0.5</Weight>
          </Layer1Weights>
        </MinSpan>
        <MinSpan name="AboutMe" pid="26" default="0" maxMinSpan="300">
          <Transform type="Rational" k="0.03"/>
          <Normalize SDev="0.16666667" Mean="0.5"/>
          <Layer1Weights>
           <Weight>0.5</Weight>
          </Layer1Weights>
        </MinSpan>
        <MinSpan       name="Memberships"        pid="35"        default="0"
maxMinSpan="100">
          <Transform type="Rational" k="0.03"/>
          <Normalize SDev="0.16666667" Mean="0.5"/>
          <Layer1Weights>
           <Weight>5.0</Weight>
          </Layer1Weights>
        </MinSpan>
        <MinSpan name="OrgNames" pid="389" default="0" maxMinSpan="100">
          <Transform type="Rational" k="0.03"/>
          <Normalize SDev="0.16666667" Mean="0.5"/>
          <Layer1Weights>
           <Weight>5.0</Weight>
          </Layer1Weights>
        </MinSpan>
        <MinSpan name="Department" pid="25" default="0" maxMinSpan="300">
          <Transform type="Rational" k="0.03"/>
          <Normalize SDev="0.16666667" Mean="0.5"/>
          <Layer1Weights>
           <Weight>5.0</Weight>
          </Layer1Weights>
        </MinSpan>
```

```xml
<MinSpan name="Contents" pid="1" default="0" maxMinSpan="300">
  <Transform type="Rational" k="0.03"/>
  <Normalize SDev="0.16666667" Mean="0.5"/>
  <Layer1Weights>
    <Weight>0.5</Weight>
  </Layer1Weights>
</MinSpan>
<MinSpan name="ContentsHidden" pid="175" default="0" maxMinSpan="300">
  <Transform type="Rational" k="0.03"/>
  <Normalize SDev="0.16666667" Mean="0.5"/>
  <Layer1Weights>
    <Weight>0.5</Weight>
  </Layer1Weights>
</MinSpan>
    <SocialDistance name="SocialDistance">
  <Bucket name="DistanceUndefined" value="0">
    <HiddenNodesAdds>
      <Add>0.0</Add>
    </HiddenNodesAdds>
  </Bucket>
  <Bucket name="Distance1" value="1">
    <HiddenNodesAdds>
      <Add>0.25</Add>
    </HiddenNodesAdds>
  </Bucket>
  <Bucket name="Distance2" value="2">
    <HiddenNodesAdds>
      <Add>0.24</Add>
    </HiddenNodesAdds>
  </Bucket>
    </SocialDistance>
    <Static name="LevelsToTop" pid="267" default="6">
      <Transform type="InvRational" k="1"/>
      <Normalize SDev="0.1445450336" Mean="0.5663648844"/>
      <Layer1Weights>
        <Weight>5</Weight>
      </Layer1Weights>
      <PrecomputeForRange from="0" to="20"/>
    </Static>
  </RankingFeatures>
 </RankingModel2NN>
</RankingModel2Stage>
```

As one example, the search engine 302 can be used to return search results associated with a relevant individual. The following tables can be provided by the system 300 as part of providing a ranking details page. For this example, the search engine 302 has received a query from "Joe Smith" that included the terms "sharepoint" "search" "relevance".

Table 2 provides various statistics for each term of the received query. For this example, equation (1) was used in part to produce the statistics.

TABLE 2

| Term | sharepoint | search | relevance |
|---|---|---|---|
| n | 12021 | 14752 | 1803 |
| BM25 Weight | 2.568297 | 2.363573 | 4.4655 |
| N | 156797 | 156797 | 156797 |
| Weighted TF | 0.503313 | 6.441167 | 0.890963 |
| Term Weight | 0.334803 | 0.865612 | 0.471169 |
| Term Score | 0.859872 | 2.045938 | 2.104005 |

Table 3 provides property hits of the search.

TABLE 3

| Term | Property | Weight | B | Original TF | Weighted TF | Length | AVDL | DL/AVDL | DL Factor | Normalized TF |
|---|---|---|---|---|---|---|---|---|---|---|
| sharepoint | AboutMe | 0.1 | 1 | 2 | 0.2 | 71 | 12 | 5.916667 | 0.289157 | 0.057831 |
| sharepoint | Memberships | 0.15 | 100 | 3 | 0.45 | 664 | 328 | 2.02439 | 0.989959 | 0.445482 |
| search | Department | 3.0 | 0 | 1 | 3 | 4 | 3 | 1.333333 | 0.75 | 2.25 |
| search | AboutMe | 0.1 | 1 | 2 | 0.2 | 71 | 12 | 5.916667 | 0.289157 | 0.057831 |
| search | Memberships | 0.15 | 100 | 27 | 4.05 | 664 | 328 | 2.02439 | 0.989959 | 4.009336 |
| search | Content | 0.1 | 1 | 1 | 0.1 | 19 | 31 | 0.612903 | 1.24 | 0.124 |
| relevance | Memberships | 0.15 | 100 | 6 | 0.9 | 664 | 328 | 2.02439 | 0.989959 | 0.890963 |

As shown in Table 3, as defined by the searching algorithm, the AboutMe managed property has a predefined weight of 0.1, the Memberships managed property has a predefined weight of 0.15, the Department managed property has a predefined weight of 3.0, and the Content managed property has a predefined weight of 0.1. Additionally, as shown, the query term "sharepoint" was found in the AboutMe and Memberships managed properties, the query term "search" was found in the AboutMe, Memberships, and the Content managed properties, while the query term "relevance" was found in the Memberships managed property.

Table 4 provides various Properties and Statistics.

TABLE 4

| | |
|---|---|
| URL | http://srch-billion-21:80/Individual.aspx?accountname=REDHOUSE\johnd |
| Title | John Doe |
| DocId | 22641 |
| Normalized Rank | 62278435 |
| OriginalScore | 62.44482 |
| Ranking Model Type | Linear |
| Ranking Model ID | D9BFB1A1-9036-4627-83B2-BBD9983AC8A1 |

Table 5 provides the Ranking Features used as part of returning the query result.

TABLE 5

| Feature | Property | Value | Transformed | Normalized |
|---|---|---|---|---|
| BM25 | | 5.009816 | | |
| MinSpan (node 1) | | 300 | −1 | |
| MinSpan (node 2) | | 100 | −1 | |
| MinSpan (node 3) | | 100 | −1 | |
| MinSpan (node 4) | | 100 | −1 | |
| MinSpan (node 5) | | 22 | 2 | |
| MinSpan (node 6) | | 2 | 2 | |
| MinSpan (node 7) | | 100 | −1 | |
| MinSpan (node 8) | | 301 | −1 | |
| MinSpan (node 9) | | 301 | −1 | |
| MinSpan (node 10) | | 300 | −1 | |
| SocialDistance | | 0 | | |
| Static | LevelsToTop | 7 | 0.125 | 0 |

As shown in Table 5, the fifth and sixth nodes have positive values identifying that the search engine 302 located query terms within the maxMinSpan range in the "AboutMe" and "Memberships" properties. Thus, a weight can be determined based in part on how close respective query terms are to one another within these fields according to the managed property hits for a corresponding search result. In one embodiment, the proximity weights of any corresponding managed properties satisfying the proximity feature can be transformed using a rational transformation and applied when scoring search results.

The value for Social Distance is zero since John Doe is not a first or second colleague of Joe Smith. Since the Social Distance value is zero for this example, a ranking weight of search results for John Doe is not adjusted. In one embodiment, a ranking weight of a search result having Social Distance value of one can be positively adjusted or incremented as compared to a search result having Social Distance value of two.

John Doe is seven levels from the top of the company's reporting hierarchy. Using the rational transformation equation above with a k value of one, the LTT multiplier for this example is 0.125. As described above, the LTT multiplier can be used to adjust a predefined weight of the LTT feature when scoring search results.

Thus, for this example, a ranking value for John Doe can be based on the BM25 value, the LTT value, and a proximity value since the social distance is zero.

Exemplary scoring functions may include a linear weighted combination of individual feature scores, a 2-layer neural net, or other scoring functions.

TABLE 6

| | |
|---|---|
| N | Total number of documents in the collection |
| N | Document Frequency - number of documents containing a term |
| BM25 Weight | log10(N/n) - a global okapi weight for a term |
| Weighted TF | Weighted sum of term frequencies in each property for a given term |
| TF | Term frequency normalized by length |
| Normalized term Factor | WTF/((1 − b) + b * dl)/avdl |
| Term Score | Term frequency squashed tfw/(k1 + tfw) |
| | BM25 score of a term, this includes only query dependent components |
| Original TF | Term frequency before weighting is applied - number of times the term occurs in the property |
| Length | Number of terms in the property |
| Doc Length | Number of terms in the document across all properties |
| AVDL | Average number of terms in the property |
| Doc AVDL | Average number of terms in the document |
| DL/AVDL | Ratio between DL and AVDL |
| DL Factor | Factor used to normalize TF - (1 − b) + b(dl/avdl) |
| Click Distance | Shortest path in the web graph from the central authority to this URL |
| URL Depth | Number of slashes in the URL |

Thus, the system 300 can operate to return relevant individuals to a searching user using the ranking features and managed properties as shown in the example above. As discussed above, the system 300 can include additional or fewer ranking features and/or managed properties according to different implementations. In one embodiment, the system 300 can be implemented within a searching environment using a training phase to determine appropriate weights to use in a two stage ranking or relevancy determination process.

Figure 4:
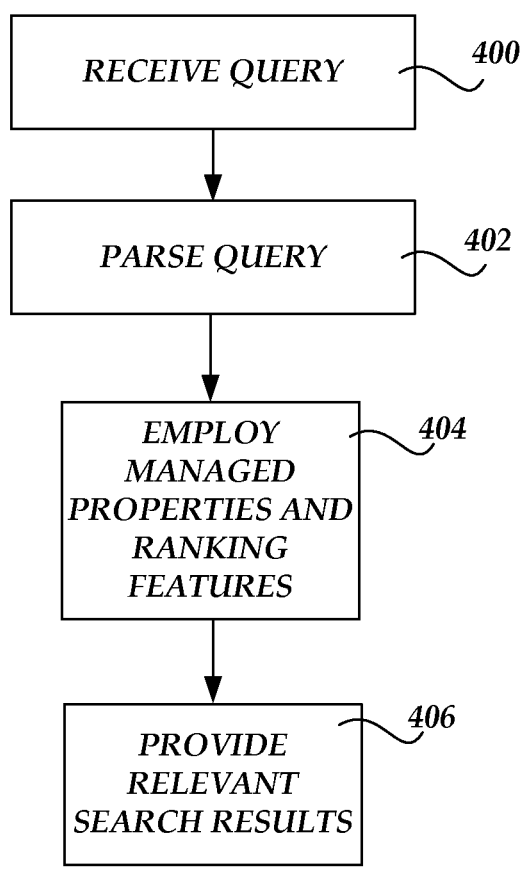
FIG. 4 is a flow diagram illustrating an exemplary process of providing relevant search results.

FIG. 4 is a flow diagram illustrating an exemplary process of providing relevant search results associated with individuals of interest to a searching user based in part on a query input and an identification parameters of the searching user. At 400, a search engine receives query data associated with a user query. For example, a user using a browser can submit a text string consisting of a number of keywords which defines the user query. This input query can include or incorporate a unique identifier (e.g., username and domain name, record-ID, etc.) that identify a searching user for use in determining search results and other parameters, such as social distance weighting values for example.

At 402, the search engine operates to parse the query to extract the query string, which can also include extracting identifying information of the searching user. At 404, the search engine can communicate with a database or other component to employ relevant managed properties and ranking features of the relevance model to use in returning relevant search results. For example, based in part on a user's identification information and the query terms, the search engine can operate to employ a predefined relevance model that includes a number of managed properties and other ranking parameters as part of returning information relevant to individuals of interest to a searching user.

In one embodiment, the search engine can search a profile store index based in part on using a searching user's identification information as a search key. For example, the search engine can operate to use metadata and other personnel data to identify individuals having particular skills or experience within a given network, including determining social distance information (e.g., first level colleagues, second level colleagues, etc.) corresponding to the particular searching user and individuals associated with relevant search results.

At 406, the search engine provides relevant search results to the searching user based in part on the implemented relevance model. In one embodiment, the search engine ranks the relevant search results using a score based in part on term hits and equation (1) above, a social distance score or value, a LTT score or value, and/or a proximity score or value. One or more of the scores can be used to rank relevant search results. It will be appreciated that a search engine can include a relevance model tuned for particular computing environments to locate relevant individuals of various systems, applications, and/or information sources (e.g., file systems, databases, web-based collections, etc.). While a certain number and order of operations is described for the exemplary flow of FIG. 4, it will be appreciated that other numbers and orders can be defined according to a desired implementation.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components including, but not limited to, wide area networks (WANs), local area networks (LANs), metropolitan area networks (MANs), proprietary networks, back-end networks, etc. Correspondingly, a number of client computing devices (e.g., clients), including desktop computers, laptops, handhelds, or other smart devices can interact with and/or be included as part of a computing environment and can use searching features described herein.

Client computing devices (e.g., enterprise clients) and servers (e.g., enterprise servers and other servers) can be any type and/or combination of processor-based devices or systems. Components of the computing environments described in the singular tense may include multiple instances of such components (e.g., servers). While certain embodiments include software implementations, they are not so limited and they encompass hardware, or mixed hardware/software solutions. Other embodiments and configurations are available.

Exemplary Operating Environment

Referring now to FIG. 5, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 5, an illustrative operating environment for embodiments of the invention will be described. As shown in FIG. 5, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a search application 24, word processing application 26, browser application 28, e-mail application 30, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A search engine operating with a processor and configured with:
    a first relevancy determination stage that includes a textual matching ranking feature, a social distance ranking feature, and a levels to the top (LTT) ranking feature to identify a number of preliminary search results, wherein the LTT ranking feature is used to generate a weight adjusting multiplier that uses a transformation operation comprising an inverse rational transformation to generate the weight adjusting multiplier; and,
    a second relevancy determination stage that includes a proximity ranking feature that operates on the number of preliminary search results, wherein the proximity ranking feature is used to determine weights to adjust relevancy scores of the preliminary search results and the search engine is further configured during the second relevancy determination stage to identify relevant individuals based in part on the inverse rational transformation operation associated with the LTT ranking feature and a transformation operation associated with the proximity ranking feature.

2. The search engine of claim 1 coupled to at least one server computer and configured to use the proximity ranking feature only as part of the second relevancy determination stage.

3. The search engine of claim 1 further configured to use a schema and a number of managed properties that include one or more of a contents property, an account name property, a preferred name property, a work email property, a username property, a contents hidden property, and a combined name property.

4. The search engine of claim 1 further configured to assign weights to query terms based in part on a ranking equation and one or more managed properties and associated query terms.

5. The search engine of claim 1 further configured to use a relevance model to identify one or more relevant individuals of interest based in part on received query terms and an identity or other identifying parameter to identify a searching user.

6. The search engine of claim 1 further configured to return documents and other information that correspond to relevant people that are associated with one or more different teams, groups, and other associations.

7. The search engine of claim 1 further configured to use the social distance ranking feature in part to adjust ranking weights of relevant individuals based in part on a determination of colleagues associated with a searching user.

8. The search engine of claim 1 further configured to use the social distance ranking feature to adjust ranking weights of relevant individuals including using a first applied weight for a first level colleague and a second applied weight for a second level colleague.

9. The search engine of claim 1 further configured to search for information associated with a plurality of networked users based in part on a plurality of managed property hits.

10. The search engine of claim 1 further configured to use a schema-defined relevancy model including one or more weighting, constant, and statistical parameters.

11. A server configured to identify individuals of interest and configured with:
    a first stage of a relevancy model that includes a textual matching ranking parameter, a social distance ranking parameter, and a levels to the top (LTT) ranking parameter to identify preliminary search results, wherein the LTT ranking parameter is used to generate a weight adjusting multiplier including using a first transformation operation comprising an inverse rational transformation to generate the weight adjusting multiplier; and,
    a second stage of the relevancy model that uses a proximity ranking parameter in part to refine the preliminary search results, wherein the proximity ranking parameter is used to determine weights to adjust relevancy scores of the preliminary search results and the relevancy model further includes a second transformation to transform a proximity value in part to provide relevant individual information.

12. The server of claim 11 further configured to use a managed property weight, a property identifier, standard deviation and mean parameters as part of returning relevant individual search results.

13. The server of claim 11 further configured to use a function to enable the proximity ranking feature as part of identifying the relevant individual search results.

14. A method of using a relevance model to provide relevant search results associated with individuals of interest that comprises:
    using a textual matching ranking feature during a first relevancy stage to determine query term weights using ranking and managed property features associated with query terms;
    using a social distance ranking feature during the first relevancy stage to boost ranking weights of relevant search results;
    using a LTT ranking feature during the first relevancy stage to generate a weight adjusting multiplier including using an inverse rational transformation to generate the weight adjusting multiplier; and,
    using a proximity ranking feature during a second relevancy stage to refine the relevant results from the first relevancy stage including determining weights to adjust relevancy scores of the relevant results from the first relevancy stage based in part on query term hits associated with a set of managed properties.

15. The method of claim 14 further configured to use the second relevancy stage to resort a number of relevant results generated by the first relevancy stage.

16. The method of claim 14 further configured to use the textual matching ranking feature to determine one or more weights for query terms of a received query using an equation and a plurality of managed property parameters for each query term hit for each managed property of each identified individual.

17. The method of claim 14 further configured to use the social distance ranking feature to add a first weight to a score of each relevant individual of a first grouping, add a second weight to a score of each relevant individual of a second grouping, and add no value to a score of each relevant individual of a third grouping.

18. The method of claim 14 further configured to infer social distance information based in part on email and other electronic communications.

19. The method of claim 18 further configured to present inferred social distance information for approval, editing, and rejecting.

\* \* \* \* \*